Dec. 16, 1969  G. R. ROOT  3,483,682
CUTTER SUSPENSION UNIT FOR RIDING MOWERS
Filed Aug. 18, 1966  2 Sheets-Sheet 1
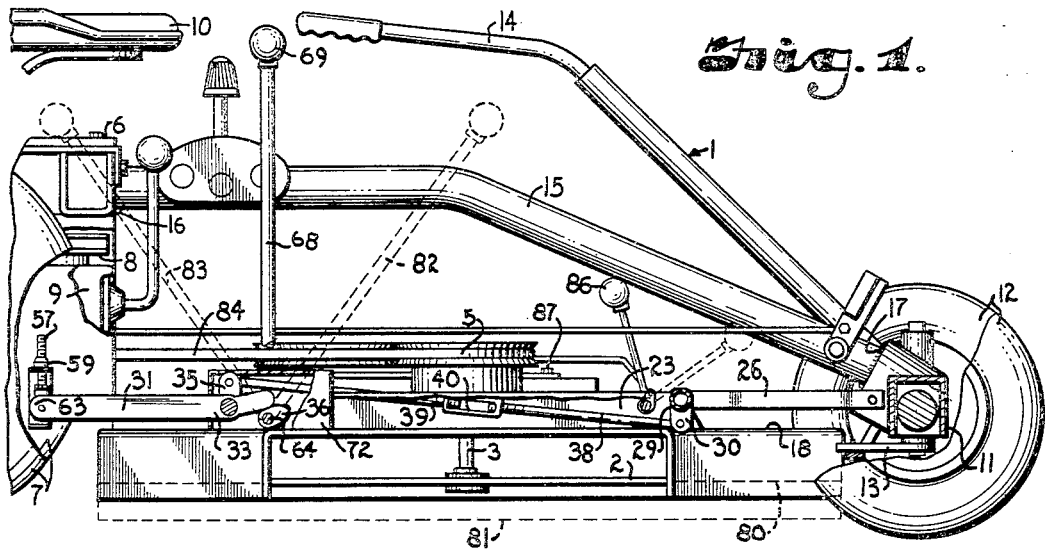
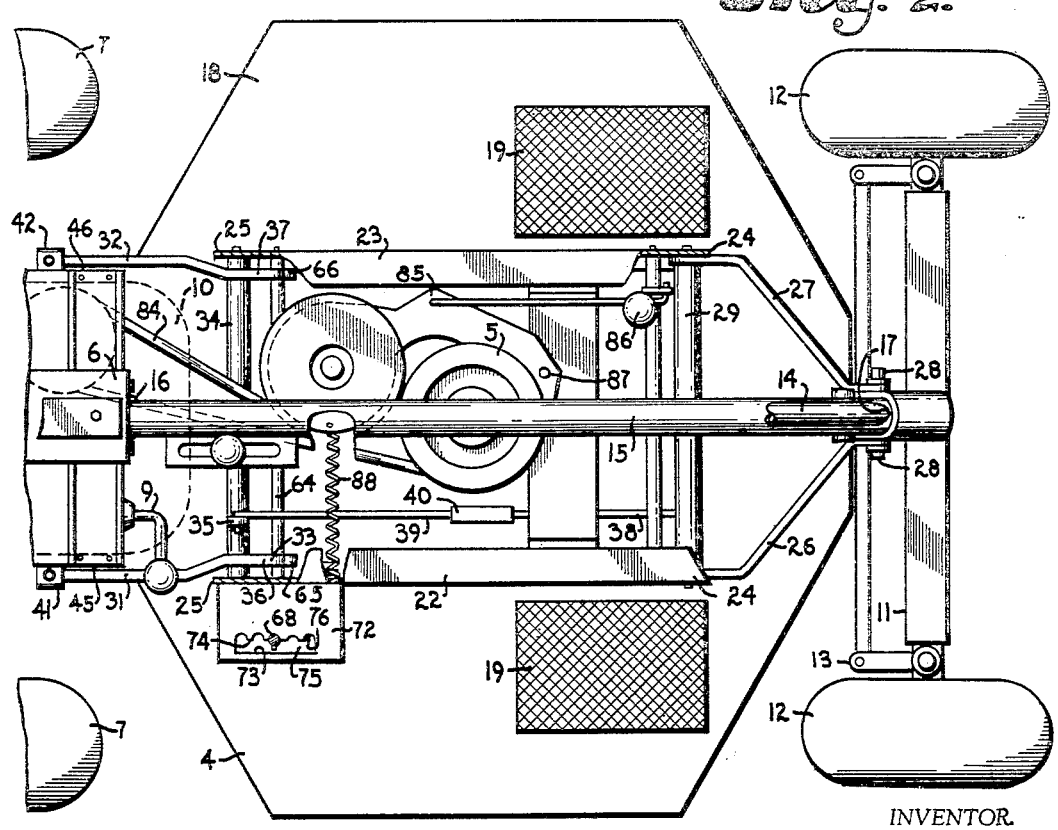
INVENTOR.
GEORGE R. ROOT
BY
Fishburn and Gold
ATTORNEYS Dec. 16, 1969   G. R. ROOT   3,483,682
CUTTER SUSPENSION UNIT FOR RIDING MOWERS
Filed Aug. 18, 1966   2 Sheets-Sheet 2

INVENTOR.
GEORGE R. ROOT
BY
*Fishburn and ...*
ATTORNEYS

United States Patent Office 3,483,682
Patented Dec. 16, 1969

3,483,682
CUTTER SUSPENSION UNIT FOR RIDING MOWERS
George R. Root, Baxter Springs, Kans., assignor to Root Manufacturing Company, Inc., Baxter Springs, Kans., a corporation of Kansas
Filed Aug. 18, 1966, Ser. No. 573,379
Int. Cl. A01d 35/26
U.S. Cl. 56—25.4    3 Claims

ABSTRACT OF THE DISCLOSURE

A riding mower blade housing is suspended from a rigid frame by interrelated lever arms having adjustments for correcting improper leveling either laterally or longitudinally. These adjustments are independent of cutting height adjustment which is controlled by a convenient lever operable even during mower use.

---

This invention relates to power mowers and, more particularly, to improved structure for supporting cutter blade housings.

The principal objects of the present invention are: to provide a cutter housing suspension structure which is easily adjusted from a tilted condition, either laterally or longitudinally, to a level condition; to provide such suspension structure which permits rapid and simple cutting height adjustment; to provide such a cutter housing suspension system which maintains the housing in a level position regardless of blade cutting height; to provide such suspension members which permit easy cutting height adjustment whether the mower is stationary or in motion; and to provide such cutter suspension structure which is simple and inexpensive in construction, rugged in use and well adapted for its intended purpose.

Other objects and advantages of this invention will become apparent from the following description taken in connection with the accompanying drawings wherein are set forth by way of illustration and example certain embodiments of this invention.

FIG. 1 is a fragmentary side elevation with parts broken away of a riding mower equipped with cutter housing suspension structure embodying this invention.

FIG. 2 is a fragmentary plan view with parts broken away showing additional details of the suspension structure of FIG. 1.

Figure 3:
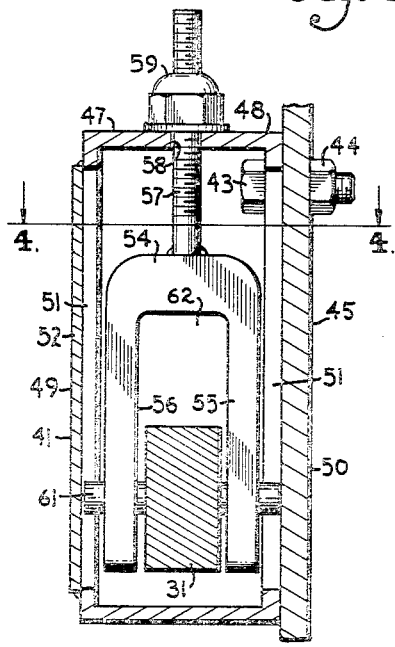
FIG. 3 is a fragmentary cross-sectional front elevation on an enlarged scale showing details of a stirrup support for a rear arm of the suspension structure.
Figure 4:
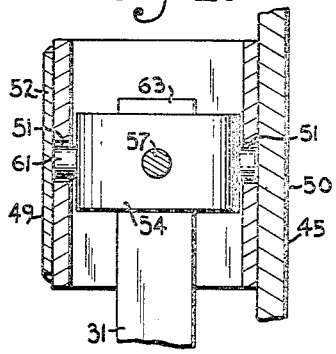
FIG. 4 is a cross-sectional view through the stirrup support taken on the line 4—4, in FIG. 3.
Figure 5:
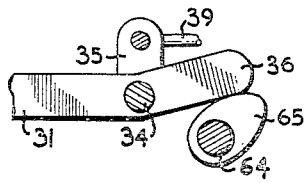
FIG. 5 is a fragmentary detail view on an enlarged scale particularly illustrating the cam and cam follower portions of a rear suspension arm.
Figure 6:
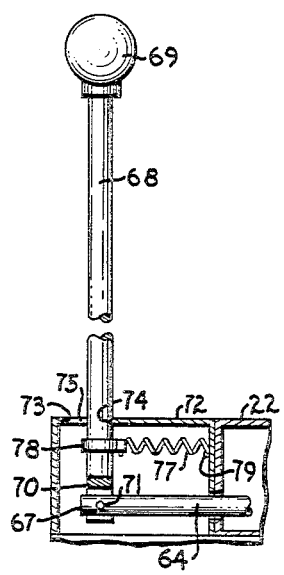
FIG. 6 is a fragmentary cross-sectional front elevation on an enlarged scale showing a height adjusting handle and adjusted position retaining parts associated therewith.

Referring to the drawings in more detail:

The reference numeral 1 generally indicates a riding power mower of the type having a horizontally rotatable blade 2 suspended from and driven by a shaft 3 extending upwardly through and mounted on a housing 4 and engaging a belt pulley 5. The mower 1 has a rear frame portion 6 supported between a pair of rear wheels 7 driven by a suitable internal combustion engine 8 through a transmission 9, the engine and transmission being mounted on the rear frame portion 6. A seat 10 for the mower operator is also mounted on the rear frame portion and extends upwardly therefrom a suitable distance.

The mower 1 includes a transversely extending front frame portion 11 positioned between a pair of front wheels 12 which are steerable by means of suitable linkage 13 controlled by a steering handle 14 extending upwardly and rearwardly of the front frame portion 11 for grasping by the operator. A rigid frame member 15, in this example, in the form of an elongated rigid tube, extends longitudinally between the front and rear portions 11 and 6 and is rigidly fixed at opposite ends respectively thereto, for example, by welding at 16 and 17. The blade housing 4 is located between the front and rear frame portions and extends beneath the frame member 15. The housing 4 has an upper horizontal wall 18 upon which is mounted suitable foot pads 19 for the convenience of the operator. The wall 18 is also associated with suspension structure embodying this invention and now described.

A pair of elongated parallel facing channel brackets 22 and 23 are fixed to the upper wall 18 and extend upwardly therefrom longitudinally of the mower. The brackets 22 and 23 have front ends 24 and rear ends 25 and are spaced apart on opposite sides of the mower longitudinal center line. A pair of elongated rigid front support arms 26 and 27 are pivotally mounted adjacent each other to the front frame portion 11 at 28 and diverge generally horizontally rearwardly of the front frame portion, FIG. 2. The rear ends of the front support arms 26 and 27 are pivotally engaged respectively with the bracets 22 and 23 at the bracket front ends 24. A front cross bar 29 rigidly connects the front support arms adjacent the front ends 24 and extends horizontally therebetween. A link member 30 is fixed to the front cross bar 29 and extends downwardly therefrom for a purpose discussed below.

A pair of elongated rigid rear support arms 31 and 32 have front ends 33 pivotally engaged with the brackets 22 and 23 at the rear ends 25 thereof. A rear cross bar 34 rigidly connects the rear arm front ends and extends horizontally therebetween. A link member 35 similar to the link member 30 is fixed to the rear cross bar in a position transversely corresponding to the link member 30, but extending upwardly therefrom as illustrated in FIG. 1. Rigid cam followers 36 and 37 are in the form of forward extensions on each of the rear arm front ends 33 and, in this example, extend forwardly of the rear cross bar 34.

A first rod 38 is pivotally secured to the first link member 30 and extends toward the second link member 35. A second rod 39 is pivotally secured to the second link member 35 and extends toward the first link member 30, the rods 38 and 39 terminating with facing or inner ends in spaced apart relation. The inner ends of the rods 38 and 39 are threaded and a turnbuckle 40 is engaged respectively therewith and adapted to selectively vary the distance therebetween upon rotation thereof.

A pair of spaced apart hanger members 41 and 42 are secured by means of suitable bolts 43 and cooperating nuts 44 to opposite vertically extending side walls 45 and 46 of the rear frame portion 6, FIG. 3. The hanger members 41 and 42 each comprise a housing 47 including a horizontal rigid top wall 48 and a pair of depending spaced apart split side walls 49 and 50 forming aligned opposed vertically extending guide slots 51. The guide slot in the respective outer side wall 49 is covered by a suitable plate 52 extending thereover, the guide slot on the wall 50, in this example, being covered by the frame portion side wall. A stirrup 53 is located within each of the housings 47 and has an upper web portion 54 and spaced apart legs 55 and 56 integral with and depending from the web portion 54 forming an inverted U in shape. A threaded shaft 57 is suitably engaged with the web portion 54 of the stirrup and extends upwardly therefrom where it is slidably received in and extended through a bore 58 in the top wall 48. A nut 59 is threadedly engaged with the shaft 57 and bears against the top wall 48 for suspending the stirrup within the housing. A pin 61 extends horizontally laterally through and between the legs 55 and 56 and terminates at opposite ends thereof within the slots 51 permitting vertical motion of the stirrup 53 in the housing with the stirrup opening 62 maintained longitudinally of the mower and preventing rotary motion of the stirrup about a vertical axis. The slots 51, however, are greater in width than the portions of the pin 61 in the slots to permit some degree of horizontal freedom longitudinally of the mower. The rear ends 63 of the rear support arms 31 and 32 are received into the stirrup openings 62 and the pins 61 respectively extend transversely therethrough for vertically pivotally mounting the rear arms in the stirrups and thereby suspending the arms from the top walls 48.

A cross cam shaft 64 extends horizontally between and is pivotally mounted to the brackets 22 and 23 forwardly of the rear cross bar 34. A pair of spaced apart cams 65 and 66 are rigidly connected to the cam shaft 64 adjacent the brackets 22 and 23 and are respectively engaged with the cam followers 36 and 37. The cams 65 and 66 are shaped to urge the cam followers pivotally vertically about the rear cross bar 34 as the cam shaft 64 is rotated.

The cam shaft 64 has an outer end 67 extending through and laterally beyond the bracket 22. An elongated handle 68 extends upwardly from and transversely to the cam shaft 64. The handle 68 has an upper end terminating in a hand grasp knob 69 and a lower end bifurcated at 70 and receiving the cam shaft outer end 67 therebetween. A pin 71 joins the handle 68 and cam shaft 64 in a flexible joint whereby the handle 68 is permitted to freely pivot or swing about the pin 71 in a plane containing the axis of the cam shaft 64, but is fixed with respect to rotation of the cam shaft.

A retainer wall 72 is fixed to the bracket 22 and extends laterally outwardly therefrom in a position spaced above and covering the cam shaft 64 at the junction with the handle 68. A pair of spaced apart edges 73 and 74 form an elongated slot 75 in the retainer wall 72 extending transversely of the cam shaft and receiving the handle 68 upwardly therethrough. The edge 74 has a plurality of spaced apart notches 76 therealong for receiving the handle 68 to selectively restrict rotary motion of the cam shaft 64 to a desired position. A helical tension spring 77 is secured at one end thereof to a ring 78 mounted on the handle 68 in a position upwardly from the bifurcation at 70 and is anchored at the other end thereof by suitable means at 79 which is fixed with respect to the housing 4. The spring 77 resiliently urges the handle 68 toward the edge 74 whereby the handle is retained in one of the notches 76 but easily withdrawn therefrom to be placed into a different notch.

By way of operation, the suspension members above described permit the housing 4 to be easily adjusted for both height of cut and leveling with respect to the wheels in the following manner. Lateral tilt of the housing is corrected by selectively rotating one of the nuts 59 with respect to the other nut so that the housing 4 tilts laterally or transversely of the mower about the front mounting area 28. Pitch or longitudinal tilting is corrected by rotating the turnbuckle 40 which causes the front portion of the housing to raise or dip with respect to the rear portion. The rear portion height may be adjusted substantially independently of the front portion height of the housing by rotating both nuts 59 in the same direction. Operational or overall height adjustment from a predetermined central position (FIG. 1) to upper and lower positions respectively designated by the broken lines 80 and 81 (FIG. 1) is accomplished by moving the handle 68 laterally outwardly to disengage same from the notches 76 and then moving it forwardly toward the position 82 if it is desired to lower the housing or rearwardly toward the position 83 if it is desired to raise the housing. After the adjustment, the handle 82 is re-engaged and retained in the appropriate notch. The housing retains its preadjusted level condition regardless of the height adjustment.

The blade 2 is driven through a belt 84 extending between the pulley 5 and the engine 8. As the housing 4 is adjusted in position, the belt 84 merely follows therealong and sufficient space is provided between the pulley 5 and the engine 8 so that undue misalignment does not occur. The blade 2 may be disengaged from the engine 8 through a mechanism 85 controlled through a suitable lever 86 which selectively produces slack in the belt 84 by pivoting about a point 87. A spring 88 maintains the belt 84 at a desired tension during driving engagement with the pulley 5. The mechanism 85 is mounted on and moves with the housing 4 during vertical or tilting adjustment.

What I claim and desire to secure by Letters Patent is:

1. In a riding power mower of the horizontal rotary blade type having a rear frame portion supported between a pair of rear wheels and a front frame portion supported between a pair of front wheels and a longitudinal rigid frame member extending longitudinally between said front and rear portions and rigidly fixed respectively thereto, a blade supporting blade housing positioned between said front and rear frame portions, adjustable suspension structure for said blade housing comprising:

(a) a pair of rigid laterally spaced apart front support arms having front ends vertically pivotally mounted to said front frame portion, said front support arms having rear ends respectively vertically pivotally engaged with said blade housing, a front cross bar rigidly connecting said front support arms and extending therebetween, a first link member fixed to said front cross bar and extending downwardly therefrom, (b) a pair of rigid laterally spaced apart rear support arms having front ends vertically pivotally engaged with said blade housing rearwardly of said front support arm rear ends, said rear support arms having rear ends respectively vertically pivotally engaged with said rear frame portion, a rear cross bar rigidly connecting said rear support arms and extending therebetween, a second link member fixed to said rear cross bar and extending upwardly therefrom, a rigid cam follower associated with said rear arm front ends and positioned forwardly thereof, tensile means pivotally secured to and extending between said first and second link members and adapted to selectively vary the distance therebetween, (c) a horizontal cam shaft positioned forwardly of said rear cross bar, a cam rigidly connected to said cam shaft and engaging said cam follower, said cam being shaped and positioned to urge said cam follower pivotally vertically as said cam shaft is rotated, means for selectively rotating said cam shaft to a desired position, means for selectively retaining said cam shaft in said desired rotational position, (d) a pair of hanger members for engaging said rear support arm rear ends to said rear frame portion, said hanger members being fixed to said rear frame portion and each including a horizontal top wall, (e) a stirrup for each of said hanger members and having a web portion and spaced apart legs integral with and depending from said web portion, a bore in said top wall, a threaded shaft member engaged with said stirrup and slidably extending through said top wall bore, (f) a nut threadedly engaged with said threaded shaft member and bearing against said top wall for suspending said stirrup, and a pin extending horizontally through said legs, said rear support arm rear ends extending between said respective stirrup legs and being pivotally engaged with said pin.

2. In a riding power mower of the horizontal rotary blade type having a rear frame portion supported between a pair of rear wheels and a front frame portion supported between a pair of front wheels and a longitudinal rigid frame member extending longitudinally between said front and rear portions and rigidly fixed respectively thereto, a blade supporting blade housing positioned between said front and rear frame portions, adjustable suspension structure for said blade housing comprising:

(a) a pair of rigid laterally spaced apart front support arms having front ends vertically pivotally mounted to said front frame portion, said front support arms having rear ends respectively vertically pivotally engaged with said blade housing, a front cross bar rigidly connecting said front support arms and extending therebetween, a first link member fixed to said front cross bar and extending downwardly therefrom, (b) a pair of rigid laterally spaced apart rear support arms having front ends vertically pivotally engaged with said blade housing rearwardly of said front support arm rear ends, said rear support arms having ends respectively vertically pivotally engaged with said rear frame portion, a rear cross bar rigidly connecting said rear support arms and extending therebetween, a second link member fixed to said rear cross bar and extending upwardly therefrom, a rigid cam follower associated with said rear arm front ends and positioned forwardly thereof, tensile means pivotally secured to and extending between said first and second link members and adapted to selectively vary the distance therebetween, (c) a horizontal cam shaft positioned forwardly of said rear cross bar, a cam rigidly connected to said cam shaft and engaging said cam follower, said cam being shaped and positioned to urge said cam follower pivotally vertically as said cam shaft is rotated, means for selectively rotating said cam shaft to a desired position, means for selectively retaining said cam shaft in said desired rotational position, (d) a pair of hanger members for engaging said rear support arm rear ends to said rear frame portion, said hanger members being fixed to said rear frame portion and each including a horizontal top wall, (e) a stirrup for each of said hanger members and having a web portion and spaced apart legs integral with and depending from said web portion, a bore in said top wall, a threaded shaft member engaged with said stirrup and slidably extending through said top wall bore, (f) a nut threadedly engaged with said threaded shaft member and bearing against said top wall for suspending said stirrup, a pin extending horizontally through said legs, said rear support arm rear ends extending between said respective stirrup legs and being pivotally engaged with said pin, and (g) a housing comprising said horizontal top wall and a pair of depending spaced apart side walls forming aligned opposed vertically extending guide slots, said stirrups being contained in said housings, (h) said pin being of smaller size at opposite ends thereof than the width of said slots and terminating at said opposite ends in said slots to permit vertical motion of said stirrups in said housings and horizontal freedom, but preventing substantial rotary motion of said stirrups on a vertical axis.

3. In a riding power mower of the horizontal rotary blade type having a rear frame portion supported between a pair of rear wheels and a front frame portion supported between a pair of front wheels and a longitudinal rigid frame member extending longitudinally between said front and rear portions and rigidly fixed respectively thereto, a blade supporting blade housing positioned between said front and rear frame portions, adjustable suspension structure for said blade housing comprising:

(a) a pair of rigid laterally spaced apart front support arms having front ends vertically pivotally mounted to said front frame portion, said front support arms having rear ends respectively vertically pivotally engaged with said blade housing, a front cross bar rigidly connecting said front support arms and extending therebetween, a first link member fixed to said front cross bar and extending downwardly therefrom, (b) a pair of rigid laterally spaced apart rear support arms having front ends vertically pivotally engaged with said blade housing rearwardly of said front support arm rear ends, said rear support arms having rear ends respectively vertically pivotally engaged with said rear frame portion, a rear cross bar rigidly connecting said rear support arms and extending therebetween, a second link member fixed to said rear cross bar and extending upwardly therefrom, adjustable tensile means pivotally secured to and extending between said first and second link members for selectively varying the distance therebetween for producing longitudinal tilting of said housing, (c) said front support arm front ends being adjacent each other, said front support arms diverging rearwardly of said front support arm front ends to said pivotal engagement with said blade housing, hanger members for engaging said rear arm rear ends to said rear frame portion for selectively varying the relative height of said rear arm rear ends, whereby variations in height between said rear arm rear ends produce lateral tilting of said housing, and (d) means for selectively rotating and locking one of said cross bars in various positions for varying the height of said housing with respect to said frame member.

References Cited
UNITED STATES PATENTS

| | | | |
|---|---|---|---|
| 1,391,948 | 9/1921 | Gledhill | 74—533 |
| 1,937,740 | 12/1933 | Woolson. | |
| 2,719,369 | 10/1955 | Lindbeck | 172—439 X |
| 2,972,850 | 2/1961 | Ariens et al. | 56—25.4 |
| 3,154,903 | 11/1964 | Smith | 56—25.4 |
| 3,269,100 | 8/1966 | Smith | 56—25.4 |

ROBERT PESHOCK, Primary Examiner

P. A. RAZZANO, Assistant Examiner